United States Patent
Schneider et al.

(10) Patent No.: US 7,451,043 B2
(45) Date of Patent: Nov. 11, 2008

(54) METHOD FOR DETERMINING AN UPWARD JOURNEY FOR ALL-WHEEL DRIVE VEHICLES

(76) Inventors: Gerold Schneider, Alte Knocke 8, D-35085 Ebsdorfergrund (DE); Roland Caspary, Kalkentalstr. 4-6, D-60489 Frankfurt/M (DE); Karel Stastny, Katharina-Petr.-Str. 13, D-65936 Frankfurt/M (DE)

( * ) Notice: Subject to any disclaimer, the term of this patent is extended or adjusted under 35 U.S.C. 154(b) by 687 days.

(21) Appl. No.: 10/504,101

(22) PCT Filed: Feb. 13, 2003

(86) PCT No.: PCT/EP03/01417

§ 371 (c)(1),
(2), (4) Date: Aug. 10, 2004

(87) PCT Pub. No.: WO03/068573

PCT Pub. Date: Aug. 21, 2003

(65) Prior Publication Data
US 2005/0165549 A1 Jul. 28, 2005

(30) Foreign Application Priority Data
Feb. 13, 2002 (DE) .............................. 102 06 108

(51) Int. Cl.
*G01C 21/30* (2006.01)
(52) U.S. Cl. .................... 701/210; 701/69; 701/70; 701/79; 701/211; 303/138; 303/168; 180/197
(58) Field of Classification Search .............. 701/69, 701/70, 74, 79, 84, 210, 211; 303/138, 166, 303/168, 173, 186; 180/197
See application file for complete search history.

(56) References Cited

U.S. PATENT DOCUMENTS 4,974,163 A * 11/1990 Yasuno et al. ............... 701/74

FOREIGN PATENT DOCUMENTS

| DE | 38 09 101 A1 | 9/1989 |
| DE | 197 32 554 A1 | 2/1999 |

OTHER PUBLICATIONS

International Search Report of Application No. PCT/EP03/01417 dated Aug. 28, 2003.
Patent Abstract of Japanese Publication No. 2002046509.

* cited by examiner

*Primary Examiner*—Gertrude Arthur Jeangla
(74) *Attorney, Agent, or Firm*—RatnerPrestia

(57) ABSTRACT

A method for controlling driving on a hill of an all-wheel drive vehicle, wherein vehicle acceleration is determined and the gravitational acceleration is measured. To improve the accuracy of the determination of the vehicle reference speed in all-wheel drive vehicles, the method comprises the following steps: determining the acceleration at the secondary axle (Tc4wdHaAcc) from one or both of the two wheel speeds, determining the deviation (Slope) between the acceleration at the secondary axle (Tc4wdHaAcc) and the measured acceleration (LoSenAcc), filtering the determined deviation (SlopFilt) with a time constant (T1Slope), comparing the deviation (Slope) with the filtered deviation (SlopFilt), determining driving situations representing the conditions 'traction slip control is active' or 'traction slip control is not active', and determining the slope in dependence on the comparison result and the driving situation.

18 Claims, 1 Drawing Sheet

METHOD FOR DETERMINING AN UPWARD JOURNEY FOR ALL-WHEEL DRIVE VEHICLES

This application is the U.S. national phase application of PCT International Application No. PCT/EP03/01417, filed Feb. 13, 2003, which claims priority to German Patent Application No. DE10206108.4, filed Feb. 13, 2002.

BACKGROUND OF THE INVENTION

1) Field of the Invention

The present invention relates to a method for controlling driving on a hill for all-wheel drive vehicles, wherein vehicle acceleration is determined and an acceleration of the vehicle is measured.

2) Description of Related Art

Modern motor vehicles are equipped with most various electronic systems for controlling and regulating the driving behavior. Examples of these systems are brake force control systems (ABS), driving stability programs (ESP) and traction slip control systems (TCS, BTCS, or TCS). The control programs provided in the electronic unit of these systems evaluate depending on the design a large number of sensors mounted into the motor vehicle. The sensors are e.g. wheel speed sensors, longitudinal acceleration sensors, lateral acceleration sensors, and yaw rate sensors. In traction slip control, the electronic unit ensures that the wheels accelerating the vehicle will not spin at great acceleration of the vehicle. On the one hand, this can be done by slowing down the spinning wheel, and/or by throttling the driving power (engine torque reduction).

DE-A 3809101 discloses a method and a circuit arrangement for controlling a TCS system with brake and engine management. For traction slip control, the wheel brake is used and/or intervention into the control of the driving engine is made with this method. To this end, traction slip control makes use of conventional components of the already provided anti-lock system (ABS) among others. The communication with the required vehicle components (e.g. engine) can take place by way of a vehicle data bus (CAN) known in the art. To implement the method, sensors for determining the wheel rotational behavior are evaluated by circuits for signal processing purposes, and corrective signals for producing electromagnetic hydraulic valves are generated and allow controlling the brake force. The electronics of the system requires the so-called vehicle reference speed $V_{ref}$ to calculate the necessary correcting variable. This reference speed is supported by gradients and generally determined by the wheel speed of the slowest wheel. The gradient is determined from the current engine torque and the empty weight of the vehicle. The calculated gradient corresponds to the theoretical vehicle acceleration at a high coefficient of friction in the plane. When the all-wheel drive vehicles are equipped with an acceleration sensor (G-sensor), said sensor is additionally used for defining the gradients. The maximum of calculated and measured gradient is determined to this end. When special driving situations are encountered, it may occur that one or more of the wheels will no longer convey the current vehicle speed as one of the wheels is spinning. It is usual in this case that the spinning wheel is not taken into consideration for producing the vehicle reference speed $V_{ref}$.

In addition, the problem is encountered in all-wheel drive vehicles that all wheels can exhibit traction slip so that there is no indicator of the vehicle reference speed, which is usually determined from the wheel speeds, in a case of driving, rendering it impossible to make a distinction e.g. between downhill driving and traction slip. This problem cannot occur in a case of driving in vehicles where one axle is driven because at least the non-driven axle can exhibit the absence of traction slip. Thus, the wheels of the non-driven axle can always be used as an indicator of the reference speed.

DE 197 32 554 A1 discloses a method and a device for determining the speed of an all-wheel driven vehicle. In this publication, individual wheel accelerations are related to the prevailing engine torque and compared with one another in order to be able to initially detect the condition that all wheels are spinning and then take remedies. It is disadvantageous in this method that for different reasons the detection thresholds must be chosen to be comparatively coarse to avoid errors in identification, with the result that the detection is not very precise and a road incline remains generally unnoticed.

When situations occur in which the wheel speeds alone are no longer sufficient to reliably determine the vehicle reference speed, substitute strategies are used. Substitute strategies permit solving individual problems known in the art such as when the driver rides the vehicle at a low coefficient of friction with spinning wheels or when the vehicle is accelerated under defined conditions when driving on a hill, especially when driving downhill. The vehicle reference speed determined as a substitute then becomes inaccurate at an increasing rate when conditions coincide, and there is the need to solve also problems arising when an all-wheel driven vehicle suffers from an unstable wheel run during downhill driving, for example.

The influence of driving on a hill is only inappropriately or not at all taken into consideration in the above-mentioned electronic systems for controlling the vehicle behavior. When driving down a slope, the actual vehicle acceleration is higher than the calculated vehicle acceleration [f(engine torque, vehicle mass)] and the measured vehicle acceleration (G-sensor or acceleration sensor) shows an acceleration value falsified by the gradient component. To compensate the slope, an invariable component or a fixed gradient has been added so far to the calculated gradient under defined conditions. This type of a slope correction is necessary to rule out a too low reference speed during downhill driving. Said slope correction is, however, linked to conditions that may cause shortcomings on different road surfaces.

SUMMARY OF THE INVENTION

An object of the invention is to disclose a method of determining a slope and a method of adapting the vehicle reference speed to the determined slope, which achieve correct results in a reliable manner and with low effort.

This object is achieved with the features of the independent claims. Dependent claims are directed to preferred embodiments of the invention.

Apart from determining the vehicle reference speed from the signals of one or two wheel sensors on the secondary axle, the vehicle acceleration, especially the longitudinal vehicle acceleration, is determined indirectly or directly from the wheel signals and related in a comparison to an acceleration measured by means of a sensor. That vehicle axle is referred to as the secondary axle that can be connected in an all-wheel drive vehicle. As this occurs, the effect is utilized that when driving on a hill the difference between the axle acceleration and G-sensor acceleration indicates the slope. The relation slope (Slope)=axle acceleration (from the wheel rotational speeds)−measured acceleration (G-sensor)

applies.

As the wheel acceleration is directly related to the vehicle acceleration, the determined slope is correct only with a slip-free run of the wheels. Therefore, 'stable' wheels are defined, and the actual slope is determined in response to the respective situation.

The detection of stable wheels founds on the knowledge that the slope variations of roadways change only at a relatively slow rate. Therefore, only the low-frequency component of the determined signal is used for the slope (Slope). The low-frequency component is extracted by filtering the slope with a time constant $T1_{Slope}$ in a low-pass filter of first order.

Filtered slope (SlopeFilt)=$PT1\_Filt$(Slope)

With the two signals 'slope' and 'filtered slope' the quality is estimated with respect to stable wheels and, thus, the determined slope. The quality estimation and the determination of the slope is executed in dependence on the respective driving situation, i.e. whether traction slip control is active or not active, or the vehicle is or is not subjected to a traction slip control operation.

A first allowable variance (SlopeVar) is produced by filtering the result of comparison between slope and filtered slope as an indicator of the quality. The first variance is determined by low-pass filtering from the r.m.s. deviation of the current deviation (Slope) and the filtered deviation (SlopeFilt). Further, a threshold value Tcs0_est_slope_var_limit of the variance is empirically determined and taken into consideration in the learning or detection strategy for 'stable wheel rotational behavior'. When the determined value of the first variance is below the threshold value, stable wheel rotational behavior is assumed when traction slip control is not active. The determined slope can be used for the determination of the slope SlopeFilt or a saved slope SlopeSave and the related gradient adaptation.

When the system is under active traction slip control, meaning in a TCS engine control operation or BTCS brake control operation, external disturbances, such as quantities describing the road surface (low coefficient of friction, e.g. ice) can lead the testing of plausibility to results mirroring stable conditions although unstable wheel runs prevail. Therefore, an unstable wheel rotational behavior is always assumed when traction slip control is active, and a slope is allowed only according to defined rules (linguistic terms). The rules are used to avoid a slope, which is estimated wrongly at a low coefficient of friction, for example. To this end, a second variance (TorqueVar) is favorably determined which represents the acceleration of the secondary axle in dependence on the engine torque. The second variance (TorqueVar) is evaluated in conjunction with the first variance (SlopeVar). In a driving situation where traction slip control is active, it is then possible to make a distinction between a quantity (downgrade force when driving on a hill) that is produced externally and drives the vehicle and a quantity causing an unstable wheel run (excessive torque at a low coefficient of friction) in dependence on the result of the evaluation. To this end, a threshold value Tcs0_est_torque_var_limit of the second variance (TorqueVar) is determined empirically and taken into account in the learning or detection strategy for 'stable wheel rotational behavior'. When the determined value of the second variance assumes a defined ratio to the value of the first variance, a stable wheel rotational behavior is assumed when the traction slip control is active. Testing or rendering plausible whether the acceleration at the secondary axle (Tc4wdHaAcc) indicates the actual vehicle acceleration is carried out by determining whether the determined value of the second variance (TorqueVar) reaches or exceeds e.g. 1.5 to 2.5 times the value of the first variance (SlopeVar). When the conditions 'second variance (TorqueVar)=1.5 to 2.5* first variance (SlopeVar)' and 'first variance SlopeVar<Tcs0_est_slope_var_limit' are satisfied, the filtered deviation (SlopeFilt) is trusted as being the true slope, and the saved slope (SlopeSave) is adjusted to it.

To preclude errors in the determination of the slope, learning of the slope is favorably terminated, with traction slip control active, when the first variance (SlopeVar) and the second variance (TorqueVar) reach or fall below at least one bottom threshold value Tcs0_est_slope_var_limit and/or Tcs0_est_torque_var_limit, and the respective threshold value of the variances can be equal or different. When the first variance (SlopeVar) and the second variance (TorqueVar) reach or fall below the threshold value Tcs0_est_slope_var_limit, the learning or detection strategy is terminated in order to excite the system of the traction slip control unit. The engine torque is modulated by way of the engine control unit for excitation.

The method advantageously provides that a saved slope (SlopeSave) is allowed in the presence of unstable wheel behavior when the unstable wheel behavior is determined or indicated by the relation 'first variance (SlopeVar)$\geq$Tcs0_est_slope_var_limit'.

In this arrangement, the saved slope (SlopeSave) is produced in dependence on the filtered deviation (SlopeFilt). The saved slope is then weighted with a coefficient of confidence MyOfSlope which is preferably determined in dependence on the engine torque requested by traction slip control, the current engine torque variation, the first variance, the distance between the fastest and the slowest wheel, the rate of deviation of the estimated slope (SlopeFilt) and the slope (SlopeFilt) limited by frequency.

When the slope has been safely determined, adaptation or modification of the vehicle reference speed to the driving situation takes place. To this end, a gradient derived from the determined slope is added to the reference gradient of the vehicle reference speed, i.e., raised by the determined slope. One embodiment is illustrated in the accompanying drawing and will be described in detail in the following.

DETAILED DESCRIPTION OF THE PREFERRED EMBODIMENTS

The slope offset degree$_{slope}$ is composed of two components, the estimated slope $C_{slope}$ and a safety constant $C_{SAFE}$. When the acceleration sensor or G-sensor is defective, it is not possible to assess a slope.

The determination of $C_{SLOPE}$ is illustrated after a short description of the used base signals. Thereafter will follow information for calculating the safety constant.

Base Signals

In the non-recursive approach chosen herein, the difference between the acceleration of the wheels of the secondary axle, e.g. the rear wheels Tc4wdHaAcc and the G-sensor acceleration LoSenACC according to the relation Slope=$Tc4wdHaAcc-LoSenACC$ is taken as an assessed value for the slope, with Slope representing the estimated slope of a vehicle driving forward.

Tc4wdHaAcc must mirror the true vehicle acceleration in order that Slope can be used as an assessed value for the slope, This applies only with stably running wheels of the secondary axle. When the wheels do not run stably, i.e. when the wheels are exposed to slip, the true slope is unknown.

Functional Description

Figure 1:
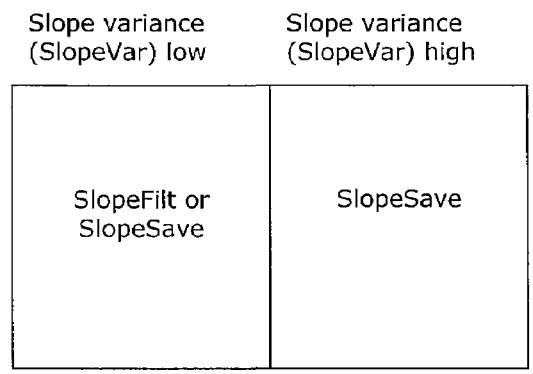
FIG. 1 is a diagrammatic view of a learning or detection strategy outside of traction slip control.

The learning or detection strategy used for determining the slope for vehicles is carried out at least in dependence on two driving situations representative of the conditions 'traction slip control is active' or 'traction slip control is not active'. FIG. 1 shows the learning or detection strategy outside of traction slip control. Said strategy uses a testing of plausibility of the torque rise Slope for detecting stably running wheels. It is utilized that slope variations of roads can change at a certain rate only within limits. To render Slope plausible, the signal is filtered with a time constant of $T1_{SLOPE}=k_1$ [msec] by means of a PT1-filter of first order and compared to the slope variation Slope. If Slope differs greatly from Slope-Filt, then Slope will change more than the incline or normal roads, and unstable wheels can be concluded in the presence of major deviations. As an indicator of the deviation, the variance of Slope is used which is the result of a low-pass filtering of the r.m.s. deviation of current and filtered slope with $T1_{VAR}=k_2$[msec]. With SlopeVar≦the threshold value Tcs0_est_slope_var_limit, SlopeFilt can be used as an assessed value of slope, that means that stable wheels prevail and that consequently Tc4wdHaAcc mirrors the true vehicle acceleration. Thus, the signal SLOPE_STAB==1 is set. The threshold value Tcs0_est_slope_var_limit is fixed empirically. It is possible in this case to directly use the assessed value SlopeFilt or, alternatively, the value SlopeSave that will be described later as $C_{slope}$. If, however, SlopeVar >=Tcs0_est_slope_var_limit, wheels of unstable run can prevail. $C_{slope}$ will then be always set to the saved slope SlopeSave, and its determination will be described later in a paragraph hereinbelow.

Figure 2:
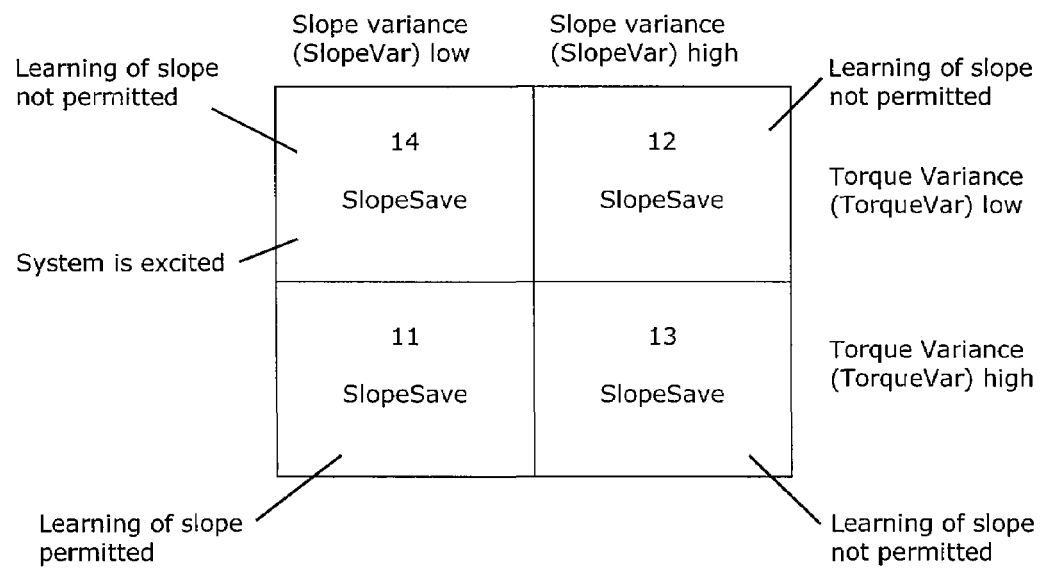
FIG. 2 is a diagrammatic view of the learning or detection strategy when traction slip control is active.

FIG. 2 shows the learning or detection strategy with an active traction slip control. In contrast to the two distinguishing criteria 'slope variance is low' or 'slope variance is high', with traction slip control not active, said strategy has four distinguishing criteria founding on the inclusion of a second variance TorqueVar based on the engine torque. This second variance TorqueVar is an indicator of the excitation of the system, which must be sufficiently excited for the slope assessment to make a distinction between the speed pattern of wheels on ice and the speed pattern of wheels when driving downhill. TorqueVar is so designed that SlopeVar and TorqueVar on ice show a similar variation, while they show a different variation on a high coefficient of friction.

As TorqueVar shall be identical with SlopeVar only on ice, the following assumptions are allowable for the calculation of TorqueVar:

1. A constant propulsive force $F_v$ is generated. In this case, the vehicle acceleration LoSenACC also is constant at $ACC_{const}$.
2. The driving track is rigid and unable to vibrate. The mass of inertia J is known.

When the acceleration at the secondary axle in dependence on the engine torque is expressed according to the relation $$Tc4wdHaAcc \sim \frac{ActTorque}{J} - \frac{F_V r_{eff}}{J}$$

and defines the operating point of the engine control unit as a low-pass filtered signal of first order of the engine torque, the variance TorqueVar results from the derivative of the relations $$Slope = Tc4wdHaAcc - LoSenACC \text{ with}$$

$$Tc4wdHaAcc \sim \frac{ActTorque}{J} - \frac{F_V r_{eff}}{J}$$

so that $$Slope = \frac{ActTorque}{J} - \frac{F_V r_{eff}}{J} - LoSenACC,$$

LoSenACC, wherein the constant components $ACC_{const}$, $F_v r_{eff}/J$ are without influence on the variance. Under the above assumptions, "SlopeVar" can only be expressed in dependence on the engine torque because Tc4wdHaAcc is proportional to $$\frac{ActTorque}{J}$$

applies.

A high TorqueVar and, simultaneously, low SlopeVar then indicates stable wheels (FIG. 2, quadrant 11). On the other hand, as FIG. 2 shows, unstable wheels are assumed in general with a high SlopeVar irrespective of TorqueVar (quadrants 12, 13). With a low TorqueVar and low SlopeVar, a decision on stable or unstable wheels is not possible (quadrant 14). The slope assessment must be disabled in this case until the system has been excited to a sufficient degree again.

The system is considered as sufficiently excited when SlopeVar would safely exceed the threshold Tcs0_est_slope_var_limit on ice due to torque modulation alone. To this end, the second variance TorqueVar based on the engine torque must also be >Tcs0_est_slope_var_limit. Due to the modulation of the engine torque by way of the quantity 'TorqueExcit', e.g. the wheels of the secondary axle will be afflicted by slip at low coefficients of friction. Acceleration values of the wheels will develop that are considerably above the vehicle acceleration, that means the wheel accelerations generally follow the modulation of the engine torque. If, however, the modulation of the engine torque takes place at a time of downhill driving at a high coefficient of friction, the vehicle acceleration will basically follow the wheel accelerations, that means the wheel accelerations will not follow the modulation of the engine torque. In this arrangement, Torque-Excit can be understood as minimal torque variation for a sufficient system excitation.

When the first variance SlopeVar falls below the learning threshold Tcs0_est_slope_var_limit (transition from quadrant 11 to quadrant 14), then torque modulation will be compelled in that the system is controlled downwards to adopt a value below the minimum value of the quantity TorqueExcit. This causes active excitation of the system again.

Slope Offset $C_{slope}$

In dependence on SlopeVar, the calculation rule for $C_{Slope}$ results as listed in the following table:

TABLE 1

Slope Offset $C_{Slope}$

| | TCS-control is not active | TCS-control is active |
|---|---|---|
| SlopeVar < Tcs0_est_slope_var_limit | $C_{Slope}$ = SlopeFilt or SlopeSave | $C_{Slope}$ = SlopeSave |
| SlopeVar >= Tcs0_est_slope_var limit | $C_{Slope}$ = SlopeSave | |

Table 1: Slope Offset $C_{Slope}$

SlopeSave is determined from the signals of the last slope learnt with stable wheels, consequently, from SlopeFilt and by way of a coefficient of confidence MyOfSlope representative of a quantity indicating to what extent SlopeSave is adjusted to the filtered slope variation SlopeFilt. More specifically, MyOfSlope indicates a factor showing to what extent there is confidence in the determined signal SlopeFilt representing the actual slope value. The stronger the confidence in the value SlopeFilt is, the more SlopeSave is adjusted to this filtered slope value.

The weighting of MyOfSlope must be chosen to be so that:
a too high assessed slope at low coefficients of friction is avoided,
a slope correction when driving downhill with spinning wheels on a downgrade is still possible,
permanent controls during downhill driving can be terminated by adjustment of the slope.

The coefficient of confidence MyOfSlope is determined for two cases to be distinguished. These cases are:
a. TCS engine control and
b. outside of TCS engine control.

The coefficient of confidence MyOfSlope is defined based on the above described learning conditions (functional description), i.e. outside of the TCS engine control,
c. the first variance SlopeVar must be low (Tc4wdHaAcc≈$Acc_{wheels}$)
that means during TCS engine control
d. the first variance must be low (Tc4wdHaAcc≈$Acc_{wheels}$)
e. the second variance TorqueVar must be high {TorqueVar≈SlopeVar (at a low coefficient of friction) or TorqueVar>SlopeVar (during downhill driving)
f. and further linguistic terms must be satisfied, such as the distance between the fastest wheel and the slowest wheel must comply to defined criteria in terms of the speed, the engine torque requested by traction slip control, the current engine torque variation, the first variance Slope-Var, the rate of the deviation of the assessed slope (Slope) and the slope (SlopeFilt) limited by frequency must satisfy defined criteria, etc.

MyOfSlope is calculated from the Fuzzy quantities in dependence on the above-mentioned criteria.

The invention claimed is:

1. Method for controlling driving on a hill for all-wheel drive vehicles, wherein vehicle acceleration is determined and an acceleration of the vehicle is measured, comprising the steps of:
  determining an acceleration at a secondary axle (Tc4wdHaAcc) from one or both of two wheel speeds;
  determining a deviation (Slope) between the acceleration at the secondary axle (Tc4wdHaAcc) and the measured acceleration (LoSenAcc);
  filtering the deviation (Slope) with a time constant ($T1_{slope}$) to generate a filtered deviation (SlopeFilt);
  comparing the deviation (Slope) with the filtered deviation (SlopeFilt);
  determining driving situations representing conditions of 'traction slip control is active' or 'traction slip control is not active'; and
  determining a slope in dependence on comparison of the deviation (Slope) with the filtered deviation (SlopeFilt) result and on the driving situation.

2. Method as claimed in claim 1,
wherein the slope is determined by means of at least one first allowable variance (SlopeVar) by filtering the result of comparison.

3. Method as claimed in claim 2,
wherein the variance (SlopeVar) is determined by low-pass filtering from a r.m.s. deviation of the current deviation (Slope) and the filtered deviation (SlopeFilt).

4. Method as claimed in claim 2,
wherein a threshold value 'Tcs0_est_slope_var_limit' of the first variance (SlopeVar) is empirically determined.

5. Method as claimed in claim 4,
wherein the filtered deviation (SlopeFilt) or of a saved slope (SlopeVar) is allowed as a slope in a driving situation where traction slip control is not active and wherein the first variance (SlopeVar)≦the threshold value (Tcs0_est_slope_var_limit.

6. Method as claimed in claim 2,
wherein a second variance (TorqueVar) is determined which represents the acceleration of the secondary axle in dependence on an engine torque.

7. Method as claimed in claim 6,
wherein the second variance (TorqueVar) and the first variance (SlopeVar) are evaluated.

8. Method as claimed in claim 7,
wherein in a driving situation where traction slip control is active, a quantity that is caused externally, drives the vehicle, or represents an unstable wheel run is determined in dependence on the evaluation of the first and second variance.

9. Method as claimed in claim 6,
wherein a threshold value Tcs0_est_torque_var_limit of the second variance (TorqueVar) is determined empirically.

10. Method as claimed in claim 6,
wherein for testing whether the acceleration at the secondary axle (Tc4wdHaAcc) indicates an actual vehicle acceleration, it is determined whether the determined value of the second variance (TorqueVar) reaches or exceeds at least 1.5 to 2.5 times the value of the first variance (SlopeVar).

11. Method as claimed in claim 10,
wherein when a condition 'second variance (TorqueVar) =at least 1.5 to 2.5 * first variance (SlopeVar)' is satisfied, the filtered deviation (SlopeFilt) is allowed as slope.

12. Method as claimed in claim 6,
wherein the step of determining the slope is terminated, with the traction slip control active, when the first variance (SlopeVar) and the second variance (TorqueVar)

reach or fall below at least one bottom threshold value Tcs0_est_slope_var_limit' or Tcs_0_est_slope_var_limit, respectively, and the threshold values, Tcs0 est slope var limit' and Tcs 0 est slope var limit can be equal or different.

13. Method as claimed in claim 11,
wherein the engine torque is modulated for exciting the traction slip control unit in the case that the first variance (SlopeVar) reaches or falls below the threshold value Tcs0_est_slope_var_limit and the second variance (TorqueVar) reaches or falls below the threshold value Tcs0_est_torque_var_limit.

14. Method as claimed in claim 4,
wherein a saved slope (SlopeSave) is allowed when an unstable wheel run is determined or indicated 'when the first variance (SlopeVar)≧Tcs0_est_slope_var_limit'.

15. Method as claimed in claim 1,
wherein a saved slope (SlopeSave) is determined in dependence on the filtered deviation (SlopeFilt) and a coefficient of confidence (MyOfSlope).

16. Method as claimed in claim 15,
wherein the saved slope is weighted with the coefficient of confidence (MyOfSlope) which is determined in dependence on at least one of an engine torque requested by traction slip control, a current engine torque variation, the first variance, a distance between a fastest and a slowest wheel, and a rate of deviation of the estimated slope (SlopeFilt) and the slope (SlopeFilt) limited by frequency.

17. Method as claimed in claim 1, wherein a vehicle reference speed is adapted to a driving situation.

18. Method as claimed in claim 17,
wherein a reference gradient of the vehicle reference speed is raised by addition of the determined slope.

* * * * *